US005515098A

United States Patent [19]
Carles

[11] Patent Number: 5,515,098
[45] Date of Patent: May 7, 1996

[54] SYSTEM AND METHOD FOR SELECTIVELY DISTRIBUTING COMMERCIAL MESSAGES OVER A COMMUNICATIONS NETWORK

[76] Inventor: John B. Carles, 40 E. 10th St. - Apt. 5H, New York, N.Y. 10003

[21] Appl. No.: 303,352

[22] Filed: Sep. 8, 1994

[51] Int. Cl.$^6$ .................................................... H04N 7/10
[52] U.S. Cl. ................................... 348/8; 348/6; 455/3.3
[58] Field of Search ................................. 348/1, 6, 8, 10, 348/12; 455/2, 3.3, 4.2, 5.1; 358/56, 84; H04N 7/10

[56] References Cited

U.S. PATENT DOCUMENTS 5,155,591  10/1992  Wachob ........................ 348/9

Primary Examiner—James J. Groody
Assistant Examiner—Sherrie Hsia
Attorney, Agent, or Firm—Darby & Darby

[57] ABSTRACT

A device and method of distributing commercial messages to an individually addressable subscriber terminal ("converter") on a network is provided. A server, located on the network, selectively tags commercial messages with routing information and converter addresses, and transmits the messages on the network to be received and displayed by the addressed converters. The addresses are selected based on information stored in a database related to demographic and other information relating to the members of the household of the subscriber. The server sends selected commercial messages to selected households.

7 Claims, 4 Drawing Sheets

SYSTEM AND METHOD FOR SELECTIVELY DISTRIBUTING COMMERCIAL MESSAGES OVER A COMMUNICATIONS NETWORK

FIELD OF THE INVENTION

The present invention relates generally to on-demand consumer ordered television and, more particularly, concerns a method for distributing advertising and commercial messages in such an environment.

BACKGROUND OF THE INVENTION

The broadcast and advertising industries have historically focused on the ability of programming to predictably deliver a mass audience of people defined by broad demographics (e.g. women 35–49 with above average income, men 18–34) as a basis for selling broadcast advertising. This system works in the current configuration of the broadcast industry, and specifically television, because there are a limited number of network channels and local stations. Further, they deliver a limited programming menu to the public, thus, neither the public nor the advertiser has many choices. Even with the advent of cable television, programming is still limited, so that audiences can be predicted.

Through the use of fiber optic cable and individual household satellite signal receptors, it is anticipated that a 500+ channel environment will soon be common. Further, with advances in high capacity video storage and movement toward digital format for television transmission, on-demand television is on the horizon, whereby a subscriber may select between viewing a program at the time of transmission or viewing a program stored in a digital library at a central location in a cable network at a time of the viewer's choosing. With the anticipated increase in viewing options, efficient delivery of defined audience for advertisers through the sale of in-program participation or pre-set time slots on a given channel will become increasingly difficult.

U.S. Pat. No. 5,260,778 to Kaufman, the disclosure of which is herein incorporated by reference, discloses an apparatus for selective distribution of messages over a communications network. A subscriber's converter is addressed according to a multilevel grouping structure. For example, in a two level grouping structure, each converter is assigned as a member of a primary group and may also be assigned to one or more subgroup. Thus, the head end can target a group of subscribers by tagging the appropriate group identifier to the message. Although this apparatus might be useful in a cable network with a large number of channels, it would not be appropriate in a more dynamic viewing on-demand environment where each converter may need to be individually addressed.

It is an object of the present invention to provide a method and system for dynamically distributing commercial programming to selected target households.

It is another object of the invention to distribute commercial programming to particular subscribers based on predetermined characteristics.

In accordance with the present invention, a system and method are provided for distributing commercial messages to an individually addressable subscriber terminal ("converter") on a network. Commercial messages to be distributed over the network contain embedded information identifying categories of recipients for each message. A server, centrally located on the network, selectively tags commercial messages with the converter addresses of subscribers satisfying the identifying categories. The commercial messages are then transmitted over the network for receipt and display by a television receiver connected to the addressed converters. The addresses are selected by the server based on information stored in a database related to demographic and other information relating to the household of the subscriber in comparison to the same information relating to households which are actual customers of the product or service which is the subject of the commercial.

BRIEF DESCRIPTION OF THE DRAWINGS

The foregoing and other features of the present invention will be more readily apparent from the following detailed description of preferred embodiments taken in conjunction with the attached drawings wherein.

DETAILED DESCRIPTION OF PREFERRED EMBODIMENTS

Figure 1:
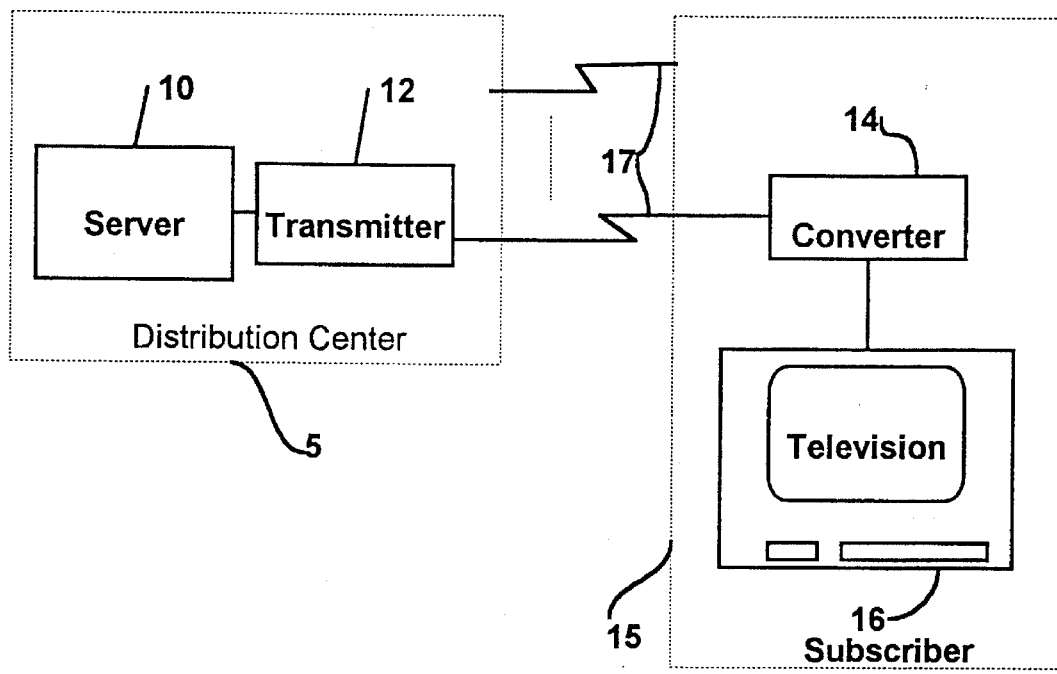
FIG. 1 is a block diagram of the system for distributing commercial messages.

FIG. 1 is a general block diagram illustration of a preferred system in accordance with the present invention. A message distribution center 5 communicates with a plurality of subscribers 15 (one is shown) over a network medium 17. The network disclosed preferably uses high speed packet switching technology, preferably a synchronous transfer mode switching (ATM) of a known type. One skilled in the an will recognize that any of a number of conventional high speed networks could be used. The message distribution center 5 controls the distribution and transmission of selected television programs, including those broadcast by broadcast stations, digitally stored or recorded movies and programs, and commercial messages.

The message distribution center 5 includes a server 10 (described in more detail later) which produces a data stream containing the programming and commercial information being transmitted, as well as information controlling the distribution of programming and commercial information. This data stream is transmitted on the network medium 17. The server 10 preferably runs on a high speed processor (not shown). One skilled in the art will recognize that the message distribution center may include several high speed processors running several servers depending on the number of converters on the network 17. The message distribution center 5 also includes a transmitter 12 for transmitting the information produced by server 10 on the network medium. Thus, the function of the message distribution center 5 is to prepare and transmit data to the subscribers 15 over network medium 17.

Each subscriber 15 must have a converter 14 (described in more detail later) for receiving the transmitted data. Converter 14 extracts from the data a signal which is appropriate for display on television receiver 16.

Figure 3:
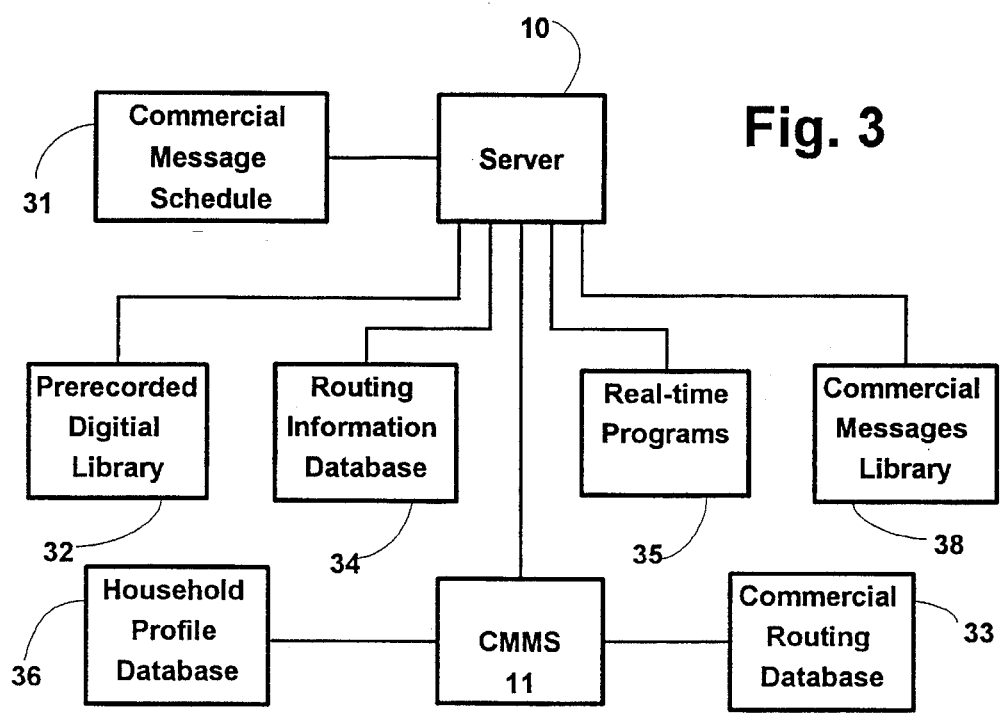
FIG. 3 is a block diagram of a preferred embodiment of a distribution center in accordance with the present invention.

As illustrated in FIG. 3, in creating the information stream, server 10 accesses several databases and libraries (32, 34, 38) to gather the information, and it can also provide analog or digital, real time programs 35, such as broadcast programs and cable programs. Server 10 accesses a prerecorded digital library 32 which is comprised of prerecorded programs in a compressed digital or other storage format. For example, the programs may be stored on different types of known storage media, such as CD ROM, laser disk, or magnetic tape. Also stored in library 32 is information concerning the time in each program at which commercial breaks occur, and the duration of each break. The same information also accompanies real time programs. In many types of programming, this information may be unnecessary, since breaks of fixed duration will occur at predetermined times.

In addition to providing programming information in its transmission stream, server 10 also provides commercial messages. Server 10 has access to a library of commercial messages 38, which contains all of its commercial messages stored in a convenient format. Each commercial message is a "smart commercial", in that it contains embedded information identifying the categories of recipients for the message. As is explained more fully below, this embedded information is utilized by a Commercial Message Management Server (CMMS) 11 to produce a set of subscriber addresses corresponding to each category of recipient identified by the embedded information.

In the process of incorporating commercial messages in its transmission stream, server 10 accesses its database and libraries and cooperates with CMMS 11 to create a commercial message schedule 31, which controls the selection and timing of those commercial messages from library 38 that will be inserted into the transmitted data stream. Whenever, server 10 selects programming for a particular subscriber, it also reserves space within the schedule 31 for the appropriate, accompanying commercial breaks. The actual messages inserted for each subscriber during each break are determined by CMMS 11 and are communicated to server 10 for insertion into schedule 31.

CMMS 11 accesses a commercial routing database 33, which includes information about required routing of commercial messages, and a household database (described in more detail below) containing statistical information related to individual subscriber households. Based upon information contained in commercial routing database 33 and information embedded in the commercial message (conveyed from server 10), CMMS 11 will select certain households or groups of households to receive certain commercial messages and will convey that information to server 10 for storage in commercial message schedule 31. The selection of households to receive commercial messages may be on the basis of household statistics in combination with requirements stored in commercial routing database 33, or the commercial messages may be associated with certain programming and/or certain viewing times and dates. When a break occurs in program material, commercial message schedule 31 determines which messages will be sent to each household, and server 10 will do so by embedding routing information from database 34 in its bit stream. Thus, each commercial message will have appropriate routing information associated with it.

Commercial routing database 33 keeps track of the routing requirements for commercial messages. It contains such information as how frequently each commercial message should be transmitted to each user or each group of users and the number of actual transmission of each message to each user or group of users. This database may also associate certain commercial messages with certain programming or certain viewing time slots.

Any or all of the databases 33, 34, or 36 could be maintained and continually updated by a separate server (not shown) or by multiple servers. For example, database 36 could be maintained by a network of servers, each providing information about a group of households defining its region.

It is also contemplated that server 10, may, at times, be required to send no commercial message, but instead, to relinquish control to another source of a commercial message. This could occur, for example, when server 10 is part of a hierarchical network and time has been reserved for insertion of commercial messages by a local station below server 10. Server 10 would then insert no commercial message for a specified interval, but would begin inserting information immediately at the end of the interval.

From the preceding description, it will be appreciated that as determined from commercial message schedule 31, server 10 transmits information through transmitter 12, preferably after receiving a request for a particular program stored in library 32, or for an incoming real time program, from an individual subscriber (possibly a sub-server). Server 10 may also commence sending information instead, based on the day of the week and the time of day, and may route the same information to many subscribers. On a separate, preferably digital channel, server 10 transmits instructions to each subscriber controlling what channel it should access for its next commercial message. Server 10 routes each commercial message to a respective channel. When a commercial break is encountered in programming received by a subscriber, the subscriber's converter 14 adjusts to receive the commercial channel instructed by server 10. When the commercial break is over, converter 14 reverts to receiving the programming from server 10.

Figure 2:
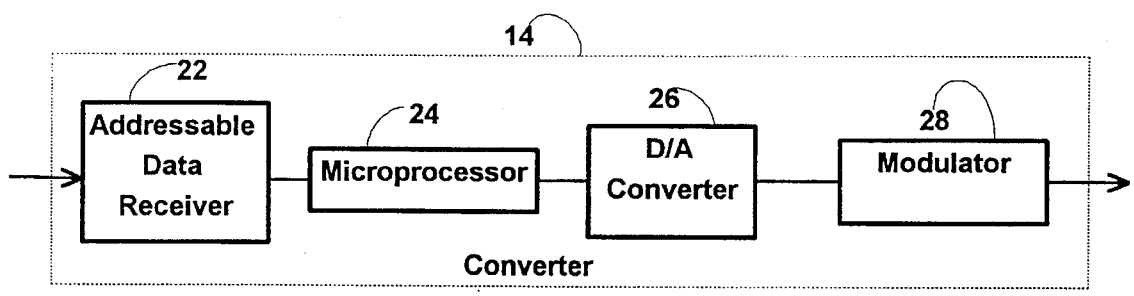
FIG. 2 is a block diagram of the converter of the present invention.

As described above, the subscriber must have a converter 14 connected to the network 17. Converter 14, as illustrated in FIG. 2, receives information addressed with the converter's network address via a known addressable data receiver 22. The information may include analog and digital signals. Only the processing of digital signals is illustrated in FIG. 2, it being assumed that the analog signals are processed by conventional equipment (not shown). The commercial messages and the control information related to them are digital signals in the preferred embodiment. The data receiver 22 preferably buffers and orders the digital information, stripping off all control and framing information (including routing information), in a high speed memory (not shown) for processing by microprocessor 24.

Microprocessor 24 accesses the buffered data and decompresses any digital program and commercial data, outputting the decompressed digital data as a digital signal to digital to analog converter 26. Digital to analog converter 26 converts the digital signal from microprocessor 24 to an analog signal. Modulator 28 modulates the commercial signal from the channel instructed by processor 10 to the appropriate television frequency for display on a particular channel being viewed by television receiver 16. One skilled in the art will understand that if the television is a digital television, the steps converting the digital signal to a modulated analog signal can be bypassed and the microprocessor would simple format the digital data to the format appropriate for the television. The function of the converter 14 is to receive information and output a signal appropriate for display on a television receiver.

Figure 4:
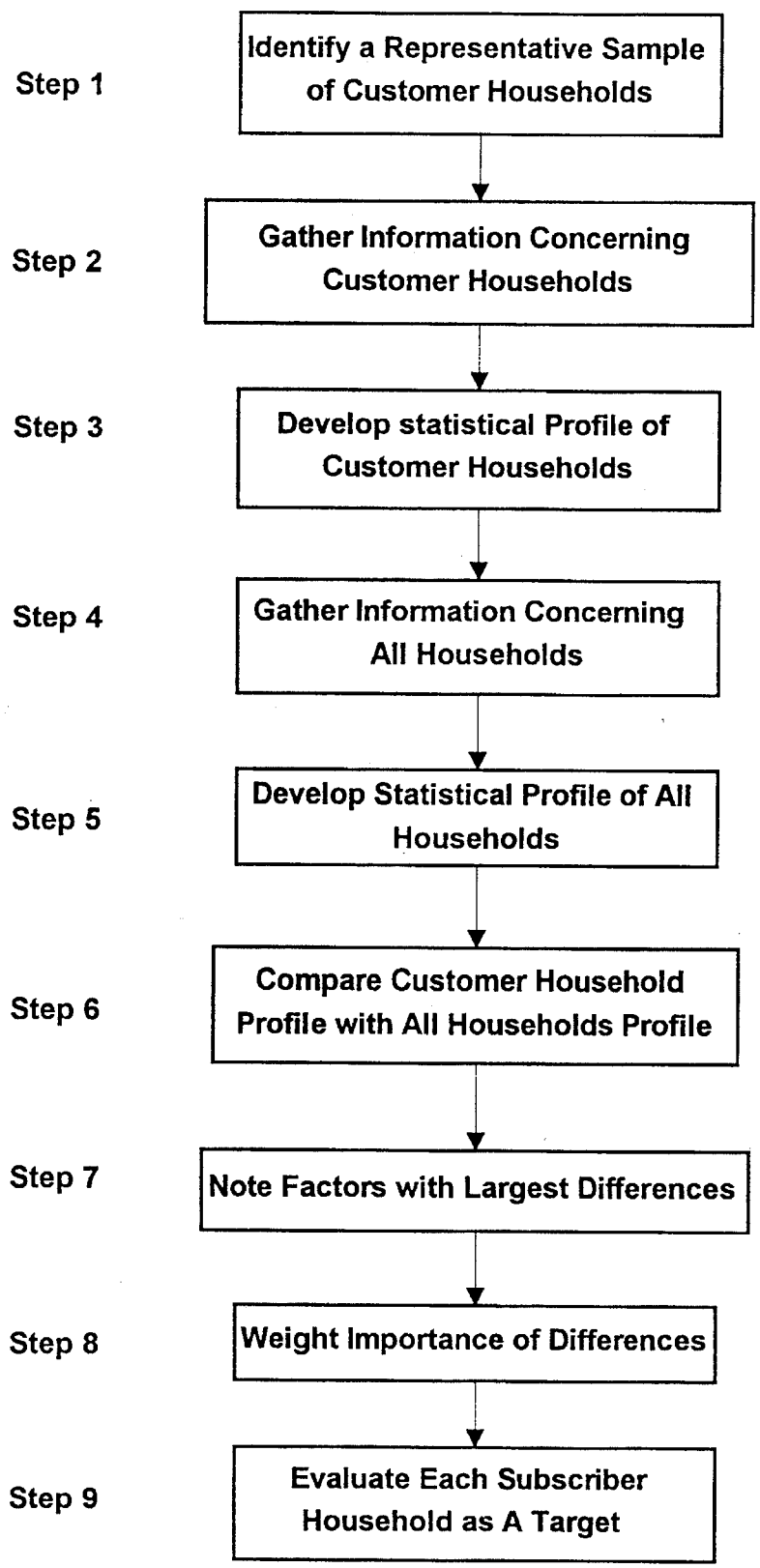
FIG. 4 is a flowchart of the method for evaluating subscribers for the purpose of targeting commercials to the most receptive audience.

As discussed above, commercial messages are selected by CMMS 11 based on profile household data stored in profile database 36. FIG. 4 is a flow diagram illustrating the preferred method utilized in CMMS 11 for determining the commercials to be sent to a subscriber. A number of categories of goods and services, which categories may be limited to specific brands, are predefined, and these same categories are used as part of the embedded information in smart commercials. Using propriety or syndicated research, a representative sample of "customer" or high frequency user households for the given product/service category or brand is selected (step 1). This sample is large enough to support statistical analysis for projection to all US households, i.e. a statistical sample. Using demographic, census and survey data, and other available data, information about these households is gathered (step 2). This information is compiled into a statistical profile of customer households (step 3). Also, the same data is gathered with respect to all households (step 4) and a statistical profile of all households is created (step 5).

In an effort to characterize target households for the product or service, the profile of the customer households is compared or correlated to the profile of all households (step 6). Demographic differences are then noted (step 7) and weighted in importance (step 8) to establish a rating for each household for each category of goods/services (step 9). For example, weighting may be based on degree of difference and frequency of occurrence. As an example, for a given product, a rating, y, may be established as follows:

$$y = 0.040425*A + 0.045920*B + 0.043766*C + 0.036453*D +$$
$$0.033336*E + 0.015284*F + 0.012396*G + 0.023163*H +$$
$$0.027470*I + 0.018362*J + 0.016994*K - 0.247068.$$

Table I defines what each index variable A through K represents in a preferred embodiment. Every subscriber is scored using the equation above. The higher the score, the more likely the subscriber is to buy the corresponding product or service.

TABLE I

| VARIABLE | INDEX |
| --- | --- |
| A | Gender |
| B | Occupation |
| C | Length of Residence |
| D | Number of Automobiles |
| E | Vehicle Type |
| F | Head of Household Age |
| G | Household Income |
| H | Median Rent: All Renter Occupied Housing |
| I | Percent of Population: Foreign Born |
| J | Percent of Population: Age 35–44 |
| K | Percent of Population: Professional/Managerial Positions |

Variables A–G are variables specifically related to the individual subscriber's household whereas H–K are variables related to the location of the subscriber's home. As can be seen from this particular equation, occupation, length of residence, and gender are the most important factors for this particular product.

The possible values for variables A–K are given in Tables II–XII. The columns are defined as follows:

VALUE: possible conditions that a variable may assume.

PERCENT OF TOTAL: percent of total analysis sample having the given value. The entries in this column always add up to 100%.

PERCENT OF TARGETS: percent of high frequency or target users meeting the value condition. Unlike Percent of Total, Percent Targets will not add up to 100%. However, the products of percent of target users for each category with the "Percent of Total" value (the size of the category in relation to the size of the analysis sample), will sum to the percent of target users in the analysis sample.

INDEX VALUE: the ratio between the entry in the "percent targets" column and the "total" entry in the same column.

TABLE II

| | Gender | | |
| --- | --- | --- | --- |
| VALUE | PERCENT OF TOTAL | PERCENT TARGETS | INDEX VALUE |
| Unknown, Female | 14.64% | 1.99% | 0.3042 |
| Male | 85.36% | 7.32% | 1.1193 |
| TOTAL | 100.00% | 6.54 | 1.0000 |

TABLE III

| | Occupation | | |
| --- | --- | --- | --- |
| VALUE | PERCENT OF TOTAL | PERCENT TARGETS | INDEX VALUE |
| Retired, Unskilled, Military, Unknown | 12.89% | 2.11% | 0.3230 |
| Blue Collar/Clerks | 56.42% | 4.63% | 0.7086 |
| Other | 5.01% | 5.05% | 0.7723 |
| White Collar | 25.68% | 13.23% | 2.0243 |
| TOTAL | 100.00% | 6.54% | 1.0000 |

TABLE IV

| | Length of Residence | | |
| --- | --- | --- | --- |
| VALUE | PERCENT OF TOTAL | PERCENT TARGETS | INDEX VALUE |
| Less Than 6 Years, Unknown | 39.53% | 4.88% | 0.7470 |
| 7–14 Years | 21.51% | 6.34% | 0.9698 |
| 14 or More Years | 38.96% | 8.32 | 1.2733 |
| TOTAL | 100.00% | 6.54 | 1.0000 |

TABLE V

| | Number of Automobiles | | |
| --- | --- | --- | --- |
| VALUE | PERCENT OF TOTAL | PERCENT TARGETS | INDEX VALUE |
| Unknown | 21.93% | 3.25% | 0.4967 |
| 0 | 12.95% | 3.96% | 0.6055 |
| 1 | 30.61% | 4.60 | 0.7037 |
| 2 | 22.90% | 10.21% | 1.5618 |
| 3 Or More | 11.61% | 13.48% | 2.0632 |
| TOTAL | 100.00% | 6.54 | 1.0000 |

TABLE VI

Vehicle Type

| VALUE | PERCENT OF TOTAL | PERCENT TARGETS | INDEX VALUE |
|---|---|---|---|
| Unknown | 34.97% | 3.52% | 0.53484 |
| Standard/Intermediate-Reg. | 24.35% | 5.27% | 0.8070 |
| Compact | | | |
| Other Compact, Subcompact | 10.36% | 7.06 | 1.0796 |
| Pass-util., Economy, | 20.76% | 8.56% | 1.3103 |
| Sporty | | | |
| Luxury | 9.55% | 15.82% | 2.4202 |
| TOTAL | 100.00% | 6.54 | 1.00 |

TABLE VII

Head of Household Age

| VALUE | PERCENT OF TOTAL | PERCENT TARGETS | INDEX VALUE |
|---|---|---|---|
| 18–24/75+: SPC, 18–44: INF | 18.50% | 2.41% | 0.3689 |
| 65–75: SPC, 55+: INF | 15.99% | 4.35% | 0.6660 |
| 25–44: SPC, 45–55: INF | 33.93 | 7.38% | 1.1284 |
| 45–64: SPC | 31.58% | 9.16% | 1.4009 |
| TOTAL | 100.00% | 6.54% | 1.0000 |

*SPC - Specific age data is available for the head of household
INF - Inferred data, based on neighborhood characteristics are used for age determination

TABLE VIII

Household Income

| VALUE | PERCENT OF TOTAL | PERCENT TARGETS | INDEX VALUE |
|---|---|---|---|
| Less Than $15,000 | 8.37% | 2.31% | 0.3529 |
| $15,000–$19,999 | 5.60% | 3.05% | 0.4665 |
| $20,000–$29,999 | 13.12% | 3.45 | 0.5275 |
| $30,000–$39,999 | 16.82% | 5.06% | 0.7743 |
| $50,000–$49,999 | 15.73% | 6.49% | 0.9936 |
| $50,000–$74,999 | 22.16% | 7.25% | 1.1098 |
| $75,000–$99,999 | 9.58% | 11.66% | 1.7838 |
| 100,000 Or More | 8.62% | 13.02% | 1.9926 |
| TOTAL | 100.00% | 6.54 | 1.0000 |

TABLE IX

Median Rent: All Renter Occupied Housing

| VALUE | PERCENT OF TOTAL | PERCENT TARGETS | INDEX VALUE |
|---|---|---|---|
| Less Than $129 | 7.74% | 2.62% | 0.4004 |
| $130–$219 | 34.09% | 3.70% | 0.5665 |
| $220–$289, Missing Data | 30.39% | 6.55 | 1.0019 |
| $290–$349 | 12.53% | 9.19% | 1.4065 |
| $350–$439 | 9.51% | 11.37% | 1.7403 |
| 440 Or More | 5.74% | 14.76% | 2.2581 |
| TOTAL | 100.00% | 6.54 | 1.0000 |

TABLE X

Percent of Population: Foreign Born

| VALUE | PERCENT OF TOTAL | PERCENT TARGETS | INDEX VALUE |
|---|---|---|---|
| Less Than 1.00% | 14.70% | 3.59% | 0.5499 |
| 1.00%–2.99% | 22.98% | 4.86% | 0.7437 |
| 3.00%–6.99%, Missing Date | 31.67% | 6.60% | 1.0101 |
| 7.00% Or More | 30.65% | 9.13% | 1.3976 |
| TOTAL | 100.00% | 6.54% | 1.0000 |

TABLE XI

Percent of Population: Age 35–44

| VALUE | PERCENT OF TOTAL | PERCENT TARGETS | INDEX VALUE |
|---|---|---|---|
| Less Than 7.00% | 4.21% | 3.08% | 0.4717 |
| 7.00%–9.99% | 22.59% | 4.54% | 0.6943 |
| 10.00%–13.99%, Missing Data | 45.07% | 5.80 | 0.8881 |
| 14.00%–15.99% | 13.08% | 8.52% | 1.3028 |
| 16.00% Or More | 15.05% | 10.97% | 1.6783 |
| TOTAL | 100.00% | 6.54 | 1.0000 |

TABLE XII

Percent of Population: Professional/Managerial Positions

| VALUE | PERCENT OF TOTAL | PERCENT TARGETS | INDEX VALUE |
|---|---|---|---|
| Less Than 11.00% | 9.54% | 3.51% | 0.5376 |
| 11.00%–19.99% | 25.19% | 4.02% | 0.6148 |
| 20.00%–217.99%, Missing Data | 25.40% | 4.68 | 0.7165 |
| 28.00%–32.99% | 11.64% | 7.01% | 1.0724 |
| 33.00%–41.99% | 14.73% | 10.14% | 1.5515 |
| 42.00%–49.99% | 7.91% | 12.08% | 1.8484 |
| 50.00% Or More | 5.58% | 13.14% | 2.0112 |
| TOTAL | 100.00% | 6.54 | 1.0000 |

When an advertiser is purchasing advertising time, it can specify a cut-off percentile for homes to receive its message. Thus if an advertiser wants to target the 30th percentile (top 30%) of subscribers (as evaluated by the above equation) for its product, the server 10 will only send the commercial messages to subscribers evaluated as being within the top 30 percent. This permits advertisers to spend advertising funds more efficiently.

Figure 5:
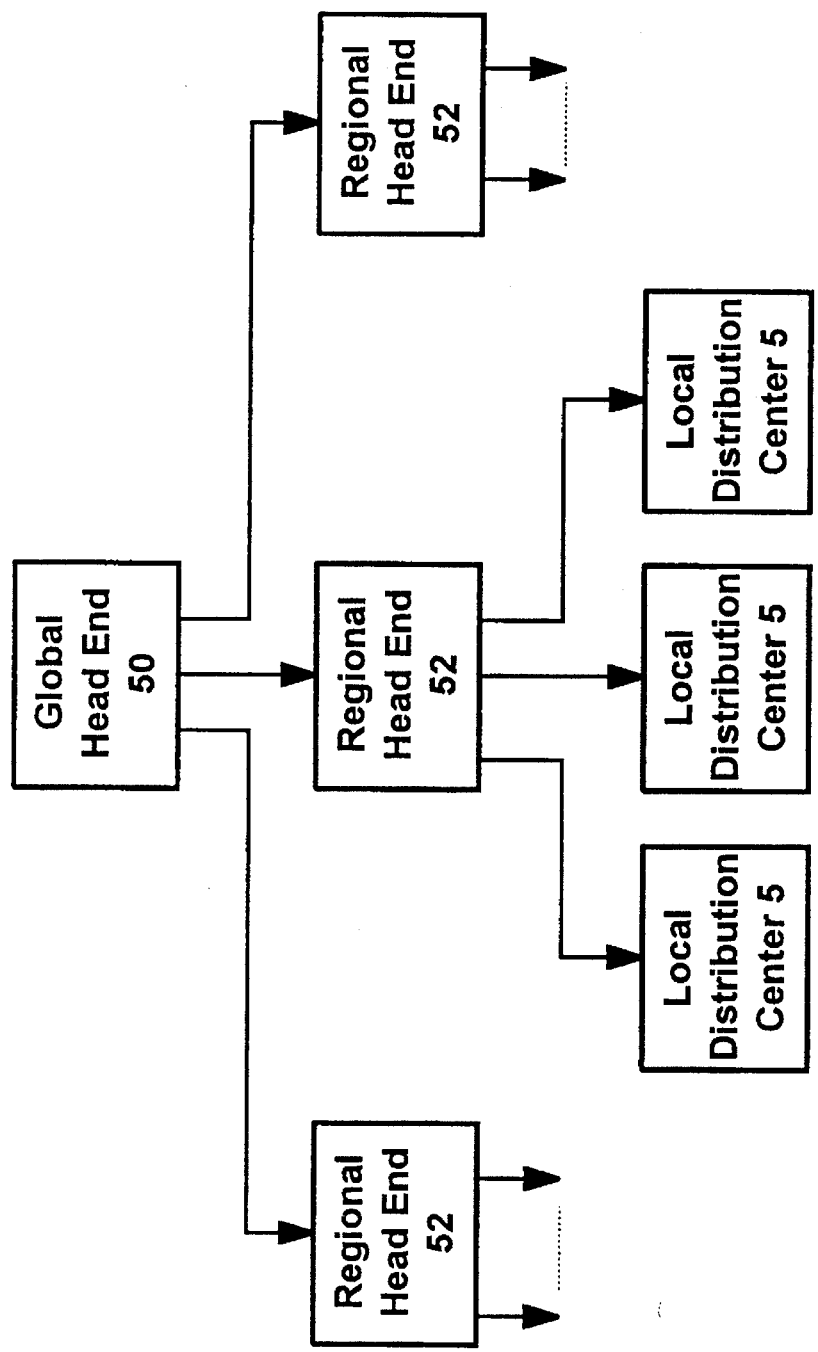
FIG. 5 is a block diagram illustrating a preferred form for a wide area network embodying the present invention.

FIG. 5 is a block diagram illustrating a preferred configuration for a hierarchical wide area network embodying the present invention. Global head end 50 is a distribution center for the entire network and performs substantially the same functions as distribution center 5 of FIG. 1. Global head end 50 communicates with a plurality of regional head ends 52, also similar to distribution center 5, each of which, in turn, communicates with a distribution center 5. It should be appreciated, however, that there may be one or more additional levels of head end between regional head ends 52 and local distribution center 5.

The head ends 50, 52 etc. are similar to the regional distribution center 5, except that each maintains databases for its full region of responsibility. It will be appreciated that Global head end databases could be entirely derived at the Global head end, with corresponding portions of the databases being sent to the appropriate lower level of distribution center. Alternately, each level of distribution center could maintain its own databases, with information being transmitted upwardly to the higher levels, where an appropriate cumulative database would be assembled. The essential difference between a head end and a local distribution center is that only the local distribution center produces converter addresses to communicate directly with subscribers.

A head end transmits downwardly information containing smart commercials, but the smart commercials contain routing information indicating groups to receive the commercial. This is accomplished by defining a target group code representative of each type of product or service that may be covered by a commercial and, as routing information, transmitting the target group code or codes associated with the commercial, together with a percentile indication. A commercial message for luxury automobiles might therefore include the target group code for luxury automobiles, together with a "30", indicating that the commercial is to be transmitted to the thirtieth percentile or top 30 percent of the customer group targeted for luxury automobiles. This is the same type of information embedded in commercials stored in Library 38 of FIG. 3.

It should be appreciated that in the system of FIG. 5, advertising information may be inserted at any level. For example, programming may be transmitted downwardly from Global head end 50 with certain commercial message slots already fried, and regional head ends 52 may then also fill other commercial message slots. Thus, by the time certain programming reaches a local distribution center 5, many of the commercial message slots may already be fried. It is then up to the local distribution center to receive and strip the group distribution codes accompanying each commercial message inserted at a higher level and to substitute the appropriate routing information for the actual subscribers in its region which meet that description. Any commercial slots in the programming which have not been fried at a higher level are, of course, available to be fried by any lower level distribution center.

While the present invention has been particularly shown and described with reference to preferred embodiments thereof, it will be understood by those skilled in the art that various changes in form and details may be made therein without departing from the spirit and scope of the invention.

What is claimed:

1. An apparatus for selectively distributing messages over a communications network comprising:

a controller for communicating over the network with a plurality of subscriber terminals in a plurality of subscriber households served by the communications network, each of said subscriber terminals having a network address;

a reservoir of data operatively associated with said controller, said reservoir containing network addresses of said subscriber terminals and subscriber profile data associated with each of said subscriber households and including demographic data;

a source of commercial messages;

selection means operatively associated with said controller for selecting at least one of said commercial messages for transmission to at least one of said subscriber terminals based on the subscriber profile data associated with said at least one subscriber terminal; and identifying means operatively associated with said controller for identifying the selected at least one commercial message with the network address of said at least one subscriber terminal;

said controller causing the transmission, over said network from said source to said at least one subscriber terminal, of commercial messages identified with the network address of said at least one subscriber terminal.

2. An apparatus as in claim 1 wherein said commercial messages provided by said source contain information identifying at least one characteristic of a household intended to receive the commercial message.

3. An apparatus as in claim 1 wherein said reservoir of data further comprises target household profile data identifying characteristics of actual customers of the subject matter of said at least one commercial message, and means for comparing the subscriber's profile data and said target profile data, said selection means selecting commercials for transmission to a subscriber terminal in relationship to the comparison between that subscriber's profile data and the target profile data.

4. An apparatus in accordance with claim 2 further comprising means for generating a target household profile data by comparing data representative of the general population of households and customer household data representative of actual customers of the subject matter of said at least one commercial message.

5. A method for selectively distributing commercial messages across a communications network to at least one of a plurality of subscriber terminals in subscriber households having a network address comprising the steps of:

identifying each of a collection of stored commercial messages with a product code representing characteristics of a subscriber household profile common to actual customers of the subject matter of that commercial message which the code identifies;

prioritizing said plurality of subscriber terminals with respect to each product code, based on the conformance of subscriber household profile data for each of said plurality of subscriber terminals to the characteristics represented by each product code; and controlling the transmission of a commercial message from said collection to said subscriber terminals so that only terminals of a specified priority relative to the product code receive the commercial message identified with the product code.

6. The method of claim 5 wherein the specified priority is included in said product code.

7. The method of claim 6 wherein the step of prioritizing said plurality of subscriber terminals comprises the steps of:

with respect to each product code, comparing profile data representative of customer households with profile data representative of all households, producing a weighting factor with respect to each difference characteristic related to the frequency of occurrence;

calculating a subscriber's priority with respect to the product code by analyzing the respective subscriber's household profile for the presence of difference characteristics and adding the corresponding weighting factor to the subscriber's priority when a difference characteristic is present.

\* \* \* \* \*